United States Patent
Shirai et al.

(10) Patent No.: US 12,019,766 B2
(45) Date of Patent: Jun. 25, 2024

(54) DATA PROCESSING DEVICE, DATA PROCESSING METHOD, AND PROGRAM

(71) Applicant: SONY GROUP CORPORATION, Tokyo (JP)

(72) Inventors: Taizo Shirai, Kanagawa (JP); Kenji Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 249 days.

(21) Appl. No.: 17/618,206

(22) PCT Filed: Jul. 16, 2020

(86) PCT No.: PCT/JP2020/027633
§ 371 (c)(1),
(2) Date: Dec. 10, 2021

(87) PCT Pub. No.: WO2021/020144
PCT Pub. Date: Feb. 4, 2021

(65) Prior Publication Data
US 2022/0261485 A1    Aug. 18, 2022

(30) Foreign Application Priority Data
Jul. 30, 2019 (JP) ................................. 2019-139318

(51) Int. Cl.
*G06F 21/60* (2013.01)
*G06F 21/32* (2013.01)
(Continued)

(52) U.S. Cl.
CPC ............ *G06F 21/602* (2013.01); *G06F 21/32* (2013.01); *G06F 21/72* (2013.01); *G06F 21/107* (2023.08)

(58) Field of Classification Search
CPC ...... G06F 21/60; G06F 21/602; G06F 21/606; G06F 21/62; G06F 21/32; G06F 21/72; G06F 21/71; G06F 21/107
See application file for complete search history.

(56) References Cited

U.S. PATENT DOCUMENTS 5,914,471 A * 6/1999 Van De Pavert .... G06Q 20/341
                                                          235/378
8,261,076 B2 * 9/2012 Abendroth .......... H04L 63/0823
                                                          713/168
(Continued)

FOREIGN PATENT DOCUMENTS

JP    H06-244793 A    9/1994
JP    2007-013366 A   1/2007
(Continued)

*Primary Examiner* — Hosuk Song
(74) *Attorney, Agent, or Firm* — Paratus Law Group, PLLC

(57) ABSTRACT

The present disclosure relates to a data processing device, a data processing method, and a program for enabling safe transmission of biometric authentication results between chips. A first chip and a second chip perform encryption and decryption using a first common key, and hold a first counter value. The first chip encrypts a command and the first counter value, and transmits the command and the first counter value to the second chip. The second chip encrypts an execution result of the decrypted command and the second counter value, and transmits the encrypted execution result and second counter value to the first chip. The first chip and the second chip synchronize the first counter value and the second counter value, each time transmitting/receiving data to/from each other. The technology according to the present disclosure can be applied to a fingerprint authentication device, for example.

20 Claims, 16 Drawing Sheets

(51) Int. Cl.
  *G06F 21/72* (2013.01)
  *G06F 21/10* (2013.01)

(56) References Cited

U.S. PATENT DOCUMENTS

| | | | |
|---|---|---|---|
| 9,065,635 B2 * | 6/2015 | Yoshimi | H04L 9/0816 |
| 10,027,639 B2 * | 7/2018 | Yoshimi | H04L 9/12 |
| 10,521,624 B2 * | 12/2019 | Asami | G06F 21/34 |
| 11,042,652 B2 * | 6/2021 | Chhabra | H04L 9/0897 |
| 11,429,751 B2 * | 8/2022 | Osugi | H04L 9/0618 |
| 2016/0321458 A1 | 11/2016 | Zhang | |
| 2018/0183591 A1 | 6/2018 | De Laat | |

FOREIGN PATENT DOCUMENTS

| | | |
|---|---|---|
| JP | 2009-140231 A | 6/2009 |
| JP | 2010-108054 A | 5/2010 |

\* cited by examiner

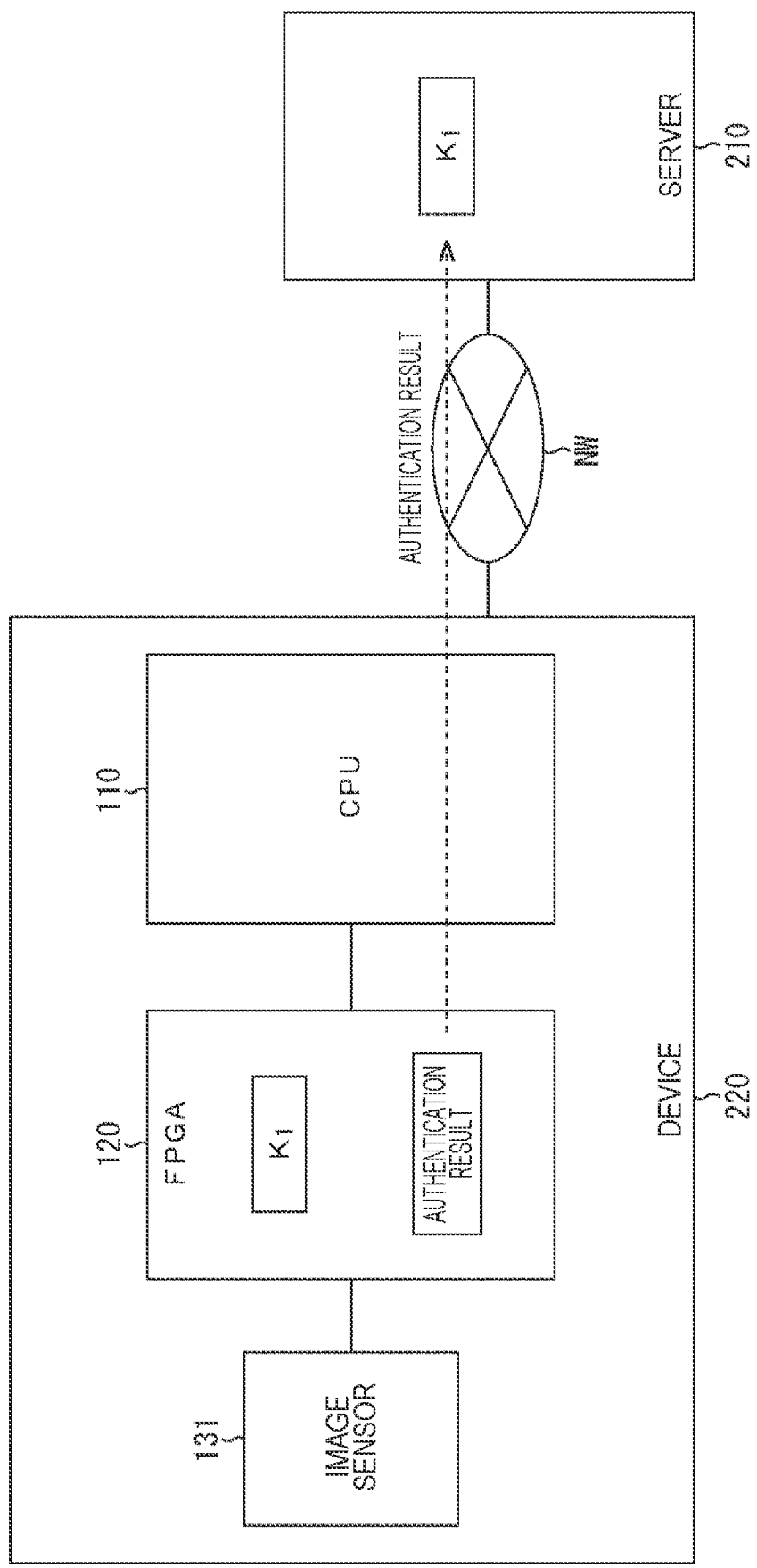

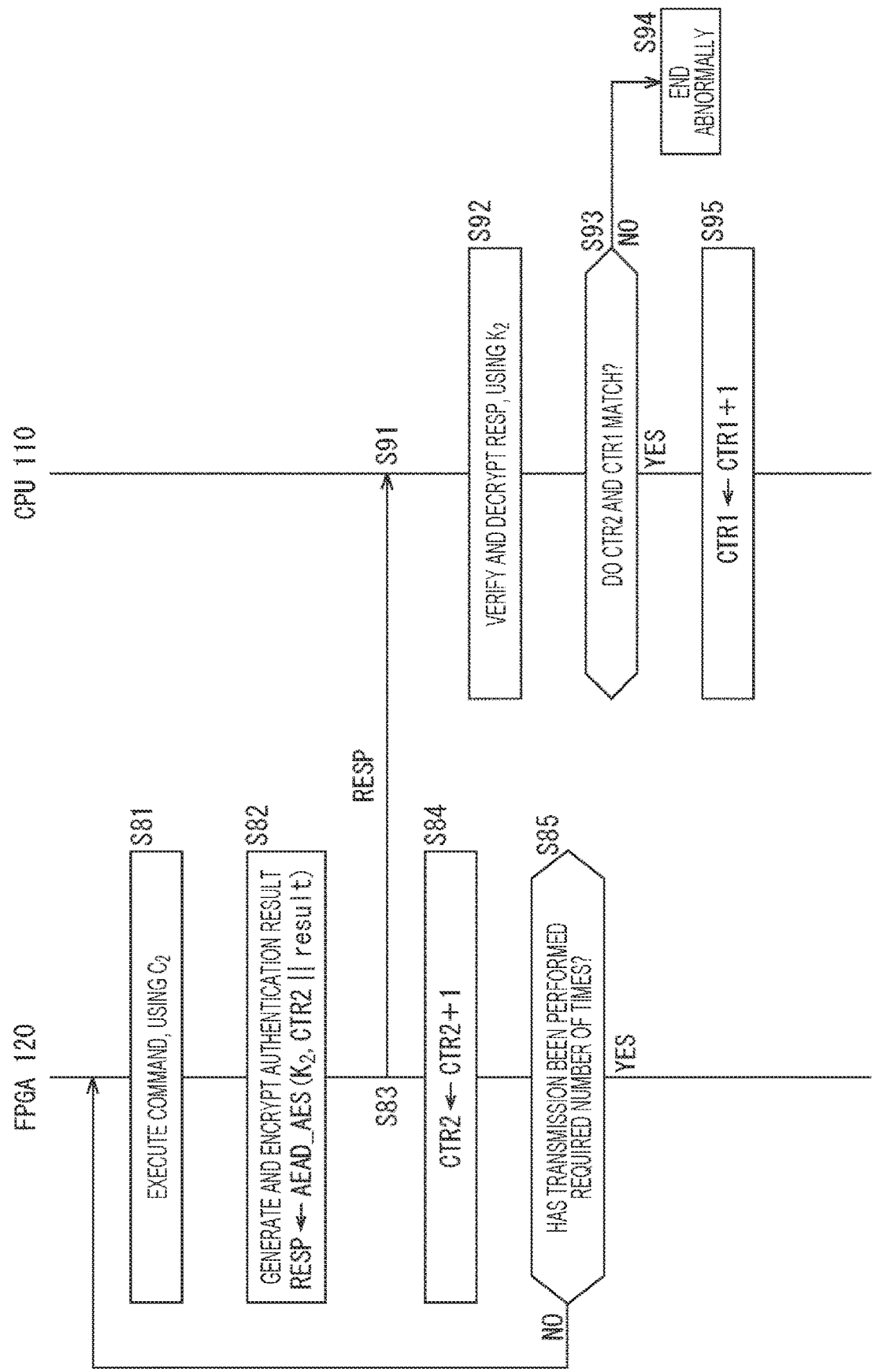

DATA PROCESSING DEVICE, DATA PROCESSING METHOD, AND PROGRAM

CROSS REFERENCE TO PRIOR APPLICATION

This application is a National Stage Patent Application of PCT International Patent Application No. PCT/JP2020/027633 (filed on Jul. 16, 2020) under 35 U.S.C. § 371, which claims priority to Japanese Patent Application No. 2019-139318 (filed on Jul. 30, 2019), which are all hereby incorporated by reference in their entirety.

TECHNICAL FIELD

The present disclosure relates to a data processing device, a data processing method, and a program, and more particularly, to a data processing device, a data processing method, and a program for enabling safe transmission of biometric authentication results.

BACKGROUND ART

Many biometric authentication technologies have been suggested as technologies for identifying individuals, using biological information such as fingerprints, faces, iris patterns, and vein patterns of humans.

For example, Patent Document 1 discloses a communication system in which a communication terminal device encrypts a message indicating that biometric authentication has been successful and notifies a server of the message, and the server starts providing a service in a case where it is notified of the message.

CITATION LIST

Patent Document

Patent Document 1: Japanese Patent Application Laid-Open No. 2009-140231

SUMMARY OF THE INVENTION

Problems to be Solved by the Invention

These days, on the other hand, there are devices that function by conducting biometric authentication, such as smartphones and wearable terminals.

However, when a result of biometric authentication conducted by an authentication chip is transmitted to another control chip in such a conventional device, there is a possibility of data falsification or a replay attack.

The present disclosure has been made in view of such circumstances, and is to enable safe transmission of biometric authentication results between chips.

Solutions to Problems

A data processing device of the present disclosure is a data processing device that includes: a first chip that performs encryption and decryption using a first common key, and holds a first counter value; and a second chip that performs encryption and decryption using the first common key, and holds a second counter value, in which the first chip encrypts a command and the first counter value, and transmits the command and the first counter value to the second chip, the second chip encrypts an execution result of the command decrypted and the second counter value, and transmits the execution result and the second counter value to the first chip, and the first chip and the second chip synchronize the first counter value and the second counter value, each time transmitting or receiving data to or from each other.

A data processing method of the present disclosure is a data processing method implemented by a data processing device that includes: a first chip that performs encryption and decryption using a first common key, and holds a first counter value; and a second chip that performs encryption and decryption using the first common key, and holds a second counter value, the data processing method including: by the first chip, encrypting a command and the first counter value, and transmitting the command and the first counter value to the second chip; by the second chip, encrypting an execution result of the command decrypted and the second counter value, and transmitting the execution result and the second counter value to the first chip; and by the first chip and the second chip, synchronizing the first counter value and the second counter value, each time transmitting or receiving data to or from each other.

A program of the present disclosure is a program for causing a computer to function as: a first chip that performs encryption and decryption using a first common key, and holds a first counter value; and a second chip that performs encryption and decryption using the first common key, and holds a second counter value, in which the first chip encrypts a command and the first counter value, and transmits the command and the first counter value to the second chip, the second chip encrypts an execution result of the command decrypted and the second counter value, and transmits the execution result and the second counter value to the first chip, and the first chip and the second chip synchronize the first counter value and the second counter value, each time transmitting or receiving data to or from each other.

In the present disclosure, a command and the first counter value are encrypted and are transmitted to the second chip, an execution result of the decrypted command and the second counter value are encrypted and are transmitted to the first chip, and the first counter value and the second counter value are synchronized in the first chip and the second chip each time data is transmitted or received between the chips.

BRIEF DESCRIPTION OF DRAWINGS

FIG. 6 is a diagram for explaining a flow of key sharing when the power is turned on.

FIG. 15 is a diagram for explaining a modification.
FIG. 16 is a diagram for explaining a modification.

MODE FOR CARRYING OUT THE INVENTION

The following is a description of modes for carrying out the present disclosure (the modes will be hereinafter referred to as embodiments). Note that explanation will be made in the following order.
1. Example configuration of a data processing device
2. Example configuration of a fingerprint authentication device
3. States and operations of the fingerprint authentication device
3-1. Initial state of the fingerprint authentication device
3-2. Key sharing and storing
3-3. Key sharing when the power is turned on
3-4. Generation and encryption of an authentication template
3-5. Encryption and transmission of an authentication result
4. Modifications
4-1. First modification
4-2. Second modification
4-3. Third modification
4-4. Fourth modification
4-5. Fifth modification
4-6. Sixth modification 1. Example Configuration of a Data Processing Device FIG. 1 is a block diagram showing an example configuration of a data processing device of the present disclosure.

Figure 1:
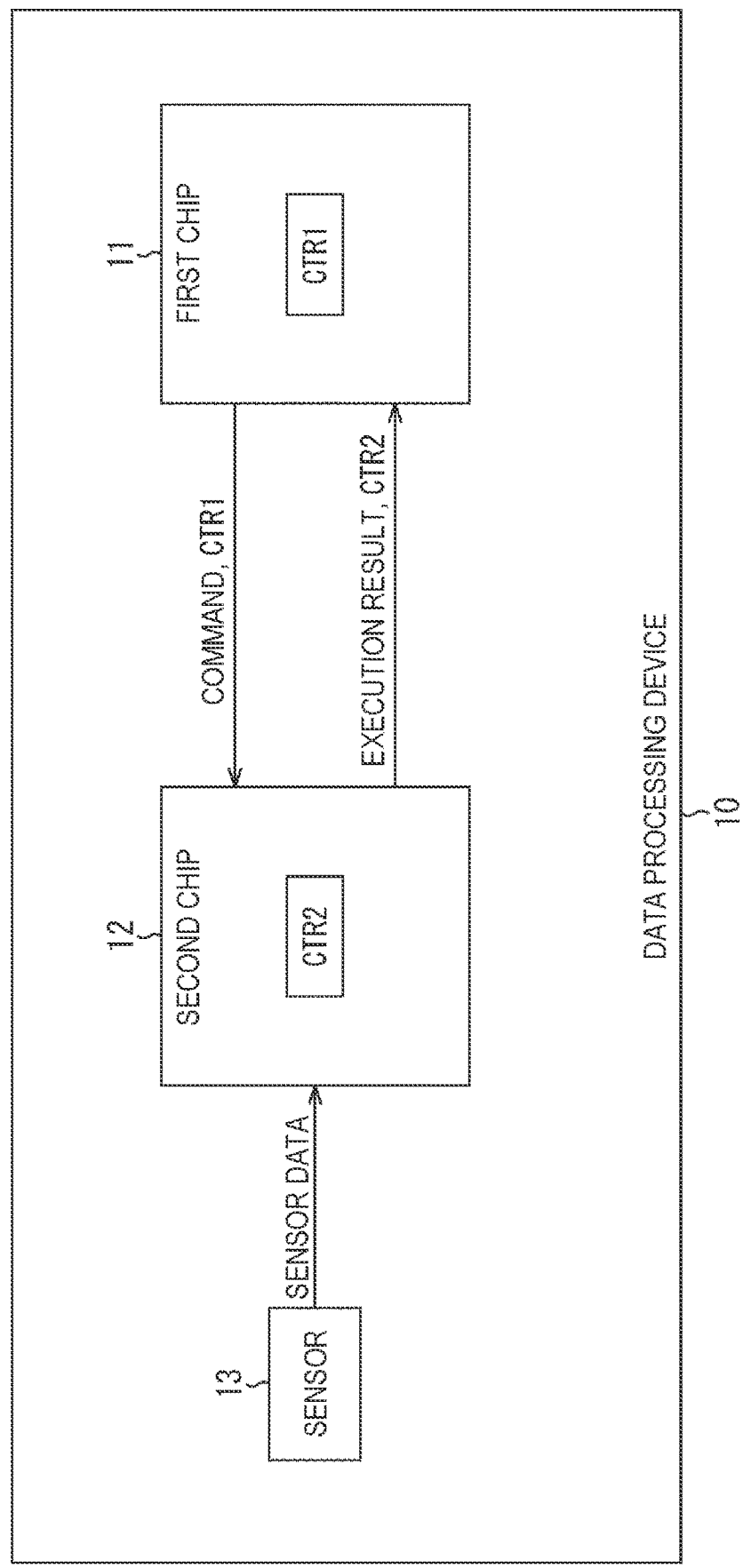
FIG. 1 is a block diagram showing an example configuration of a data processing device of the present disclosure.

A data processing device 10 shown in FIG. 1 forms part of a device that functions by conducting biometric authentication, such as a smartphone, a wearable terminal, a personal computer, augmented reality (AR) glasses, or virtual reality (VR) glasses. The biometric authentication includes fingerprint authentication, face authentication, iris verification, and vein authentication, and further includes gait authentication. For example, as for a smartphone, authentication of the user is conducted when the user uses the smartphone. As for a wearable terminal, authentication of the user is conducted when the user puts on the wearable terminal.

The data processing device 10 includes a first chip 11, a second chip 12, and a sensor 13.

The first chip 11 is a control chip that controls the second chip 12 and the like, and is formed with a central processing unit (CPU), a system-on-a-chip (SOC) including a CPU, or the like, for example. Alternatively, the first chip 11 may be formed with a secure element (SE) or a CPU including a SE.

The second chip 12 is an authentication chip that conducts biometric authentication on the basis of feature information supplied from the sensor 13, and is formed with a Field-Programmable Gate Array (FPGA) or a CPU, for example.

The sensor 13 is a sensor that acquires sensor data including biological information, and is formed with an image sensor in which a microlens array is disposed on the imaging surface, for example. The biological information may include information generated from a sensor included in a system that cooperates with an external service. The sensor detects information, and posts the information on the external service. The information may include acceleration, angular velocity, orientation, altitude, illuminance, temperature, atmospheric pressure, pulse, perspiration, brain waves, tactile sensation, olfactory sensation, gustatory sensation, other biological information, emotion, positional information, and the like, for example. Alternatively, the sensor 13 may be formed with a microphone or the like, and acquire sound as sensor data. Further, the sensor 13 may include a position detecting means that detects an indoor or outdoor position. Specifically, the position detecting means may include a Global Navigation Satellite System (GNSS) receiver, such as a Global Positioning System (GPS) receiver, a Global Navigation Satellite System (GLONASS) receiver, or a BeiDou Navigation Satellite System (BDS) receiver, for example, and/or a communication device. The communication device detects a position, using a technique such as Wi-Fi (registered trademark), Multi-Input Multi-Output (MIMO), cellular communication (position detection using mobile base stations, or femtocells), or near field communication (such as Bluetooth (registered trademark) or Bluetooth Low Energy (BLE), for example).

The first chip 11 and the second chip 12 transmit and receive data to and from each other, while both performing encryption and decryption by an authenticated encryption scheme using the same common key. The common key is installed beforehand at the factory or the like.

Further, the first chip 11 holds a first counter value (CTR1), and the second chip 12 holds a second counter value (CTR2). The first chip 11 and the second chip 12 then synchronize the counter value CTR1 and the counter value CTR2, each time data is transmitted and received to and from each other.

Specifically, after receiving data from each other, the first chip 11 and the second chip 12 determine whether the decrypted counter values CTR1 and CTR2 match. After the matching determination and data transmission to each other, the first chip 11 and the second chip 12 then update the counter value CTR1 or the counter value CTR2 held by either of the chips.

For example, using the common key, the first chip 11 encrypts the counter value CTR1 and a command to be executed by the second chip 12, and transmits the encryption result to the second chip 12. After that, the first chip 11 increments the counter value CTR1 by 1.

Using the common key, the second chip 12 verifies and decrypts the counter value CTR1 and the command from the first chip 11, and performs matching determination on the decrypted counter value CTR1 and the counter value CTR2 held therein. When the counter value CTR1 and the counter value CTR2 match, the second chip 12 increments the counter value CTR2 by 1, and executes the decrypted command. Specifically, the second chip 12 conducts biometric authentication on the basis of the decrypted command. When the counter value CTR1 and the counter value CTR2 do not match, on the other hand, the second chip 12 ends the process.

Using the common key, the second chip 12 encrypts the incremented counter value CTR2 and the result of execution of the command (the result of the biometric authentication), and then transmits the encryption result to the first chip 11. After that, the second chip 12 further increments the counter value CTR2 by 1.

Using the common key, the first chip 11 verifies and decrypts the counter value CTR2 and the biometric authentication result from the second chip 12, and performs matching determination on the decrypted counter value CTR2 and the counter value CTR1 held therein. When the counter value CTR1 and the counter value CTR2 match, the first chip 11 increments the counter value CTR1 by 1. When the counter value CTR1 and the counter value CTR2 do not match, on the other hand, the first chip 11 ends the process.

As described above, synchronization is produced so that the counter value CTR1 and the counter value CTR2 are both incremented by 2, between the transmission of the command by the first chip 11 and the transmission of the authentication result by the second chip 12.

Note that the biometric authentication result is supplied to an SE (not shown), and is to be used in payment processing by Near Field Communication (NFC), for example.

With the above configuration, falsification of data can be prevented when a result of biometric authentication at the second chip 12 is transmitted to the first chip 11 in the data processing device 10, and resistance against replay attacks can be enhanced. That is, it is possible to safely transmit a biometric authentication result between the chips. At this stage, only the biometric authentication result is transmitted at high speed and with a small communication amount, while safety is maintained.

In the description below, an embodiment in which the technology according to the present disclosure is applied to a fingerprint authentication device is explained.

2. Example Configuration of a Fingerprint Authentication Device

Figure 2:
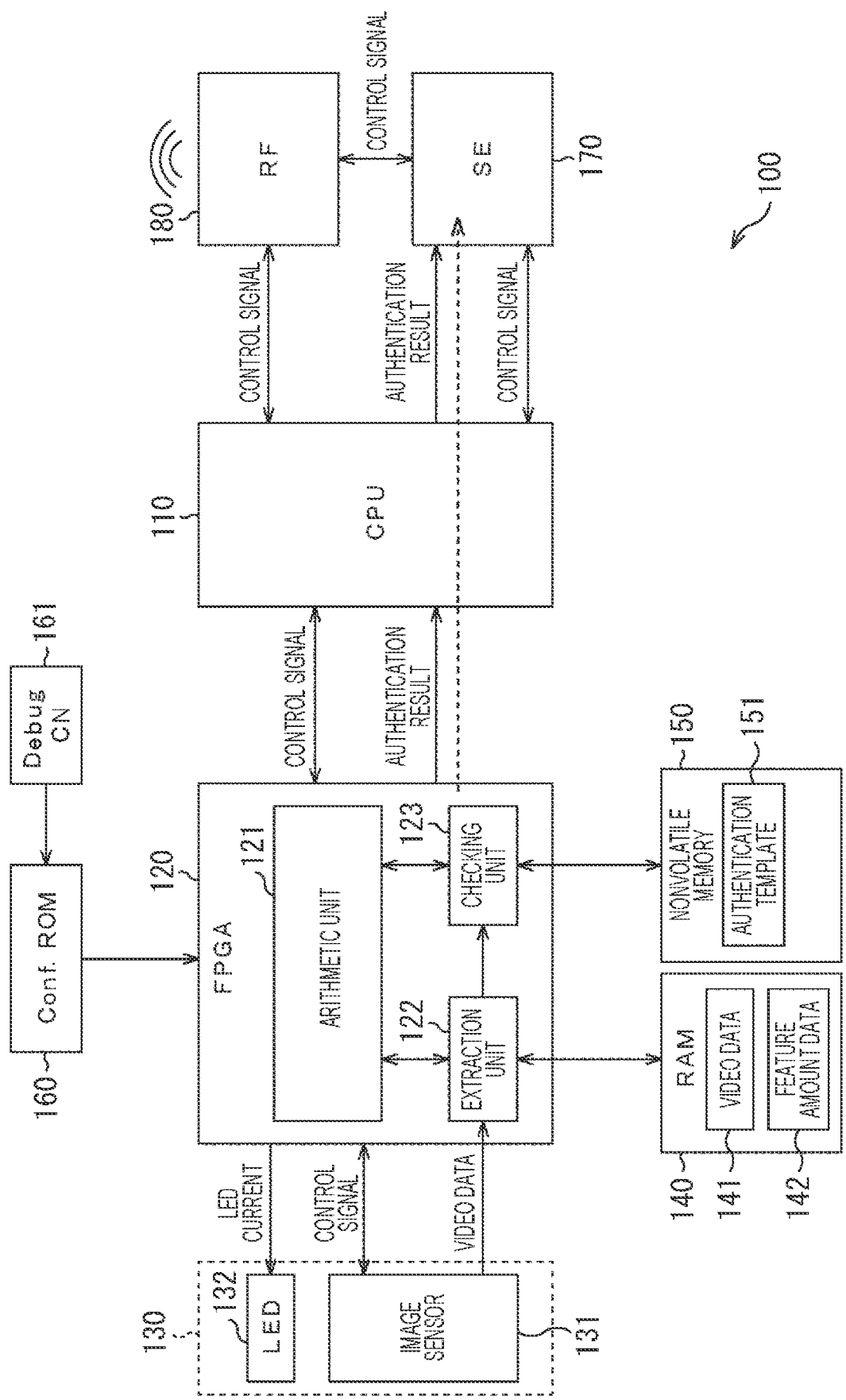
FIG. 2 is a diagram showing an example configuration of a fingerprint authentication device according to an embodiment of the present disclosure.

FIG. 2 is a diagram showing an example configuration of a fingerprint authentication device according to an embodiment of the present disclosure.

A fingerprint authentication device 100 shown in FIG. 2 form part of a device that functions by conducting biometric authentication, such as a wristwatch-type wearable terminal, for example.

The fingerprint authentication device 100 includes a CPU 110, an FPGA 120, a sensor module 130, a RAM (Random Access Memory) 140, a nonvolatile memory 150, and a configuration read only memory (ROM) 160. Further, an SE 170 and an RF communication unit 180 are connected to the CPU 110.

The CPU 110 corresponds to the first chip 11 in FIG. 1, and is formed as a control chip that controls the FPGA 120 and the like. The CPU 110 exchanges control signals with the FPGA 120, the SE 170, and the RF communication unit 180. The CPU 110 holds the counter value CTR1.

The FPGA 120 corresponds to the second chip 12 in FIG. 1, and is formed as an authentication chip that conducts biometric authentication on the basis of video data supplied from the sensor module 130. The FPGA 120 exchanges control signals with the sensor module 130. The FPGA 120 holds the counter value CTR2.

The FPGA 120 includes an arithmetic unit 121, an extraction unit 122, and a checking unit 123.

The arithmetic unit 121 is an arithmetic intellectual property (IP) core provided from the configuration ROM 160, and includes a fingerprint authentication algorithm and an FPGA control code.

The extraction unit 122 extracts feature amount data of the fingerprint of the authentication target finger from video data supplied from an image sensor 131, on the basis of the fingerprint authentication algorithm of the arithmetic unit 121. The video data from the image sensor 131 and the extracted feature amount data are temporarily stored as video data 141 and feature amount data 142 in the RAM 140.

The checking unit 123 checks the feature amount data extracted by the extraction unit 122 against an authentication template 151 stored in the nonvolatile memory 150, on the basis of the fingerprint authentication algorithm of the arithmetic unit 121. The result of the check is supplied as the fingerprint authentication result to the SE 170 via the CPU 110.

The sensor module 130 includes the image sensor 131 and an LED light 132. The image sensor 131 images the fingerprint of the authentication target finger, and supplies the obtained video data to the FPGA 120. The LED light 132 irradiates the fingerprint of the authentication target finger with light, on the basis of the LED current from the FPGA 120.

The RAM 140 temporarily stores the video data 141 and the feature amount data 142 supplied from the extraction unit 122.

The nonvolatile memory 150 stores the authentication template 151 generated in advance. The authentication template 151 is read by the checking unit 123 of the FPGA 120, and is used in the check against the feature amount data extracted by the extraction unit 122.

The configuration ROM 160 stores the arithmetic IP core mentioned above, and provides the arithmetic IP core to the arithmetic unit 121. A debug controller 161 is connected to the configuration ROM 160 as necessary.

The SE 170 performs payment processing by NFC via the RF communication unit 180, on the basis of the authentication result supplied from the FPGA 120 via the CPU 110. Note that the SE 170 may be included in the CPU 110.

With the configuration described above, the fingerprint authentication device 100 can perform payment processing through fingerprint authentication.

3. States and Operations of the Fingerprint Authentication Device

In the description below, states and operations of the fingerprint authentication device 100 described above are explained.

3-1. Initial State of the Fingerprint Authentication Device

Figure 3:
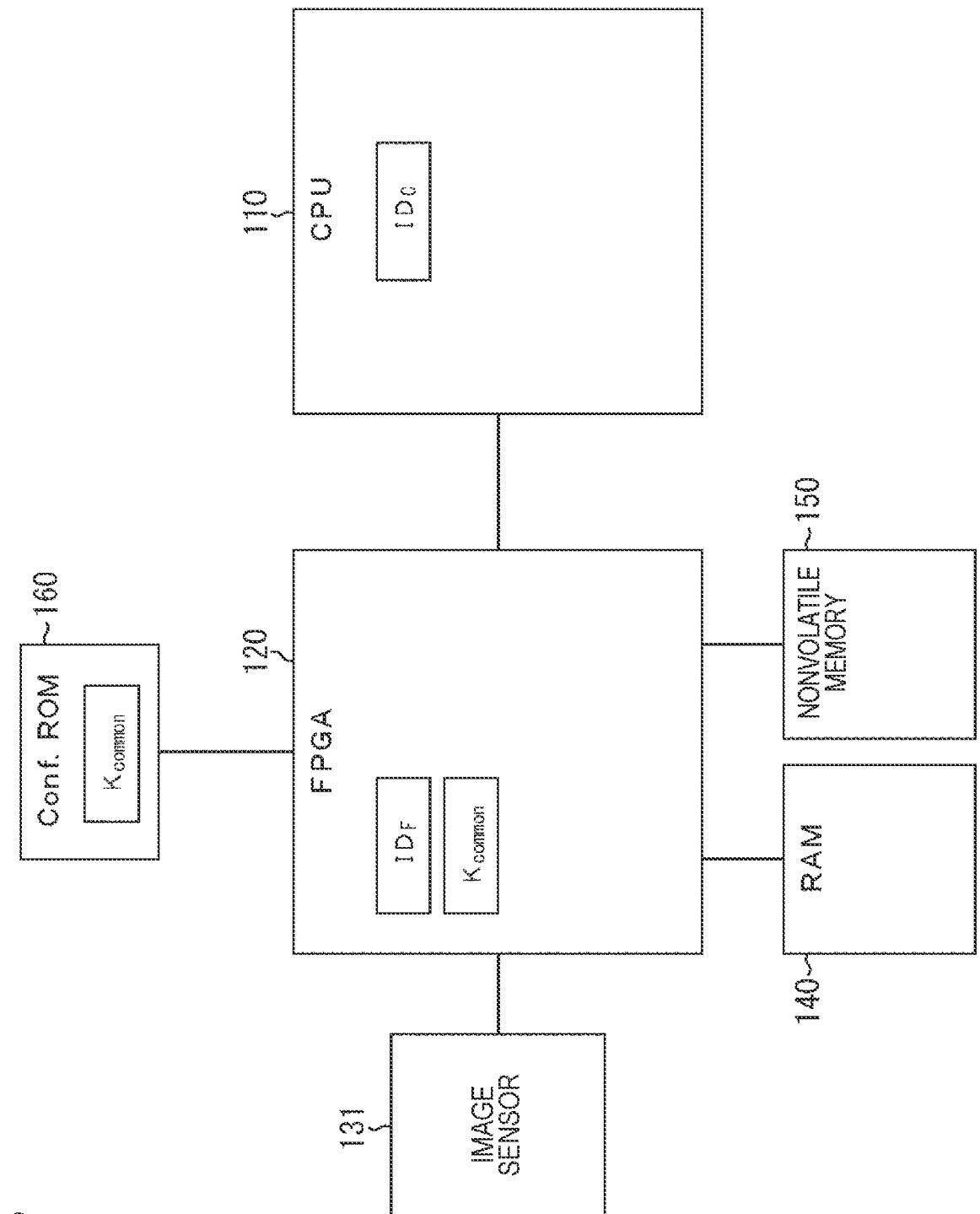
FIG. 3 is a diagram showing a state of the fingerprint authentication device.

FIG. 3 is a diagram showing the initial state of the fingerprint authentication device 100 at the factory.

As for the fingerprint authentication device 100 to be explained with reference to FIG. 3 and the drawings that follow, only the CPU 110, the FPGA 120, the image sensor 131, the RAM 140, the nonvolatile memory 150, and the configuration ROM 160 are shown in the drawings.

In the fingerprint authentication device 100 in FIG. 3, the CPU 110 holds unique identification information $ID_C$.

Meanwhile, the FPGA 120 holds unique identification information $ID_F$ as hardware information. Further, the FPGA 120 holds a common key $K_{common}$ supplied as configuration information by the configuration ROM 160.

3-2. Key Sharing and Storing

Figure 4:
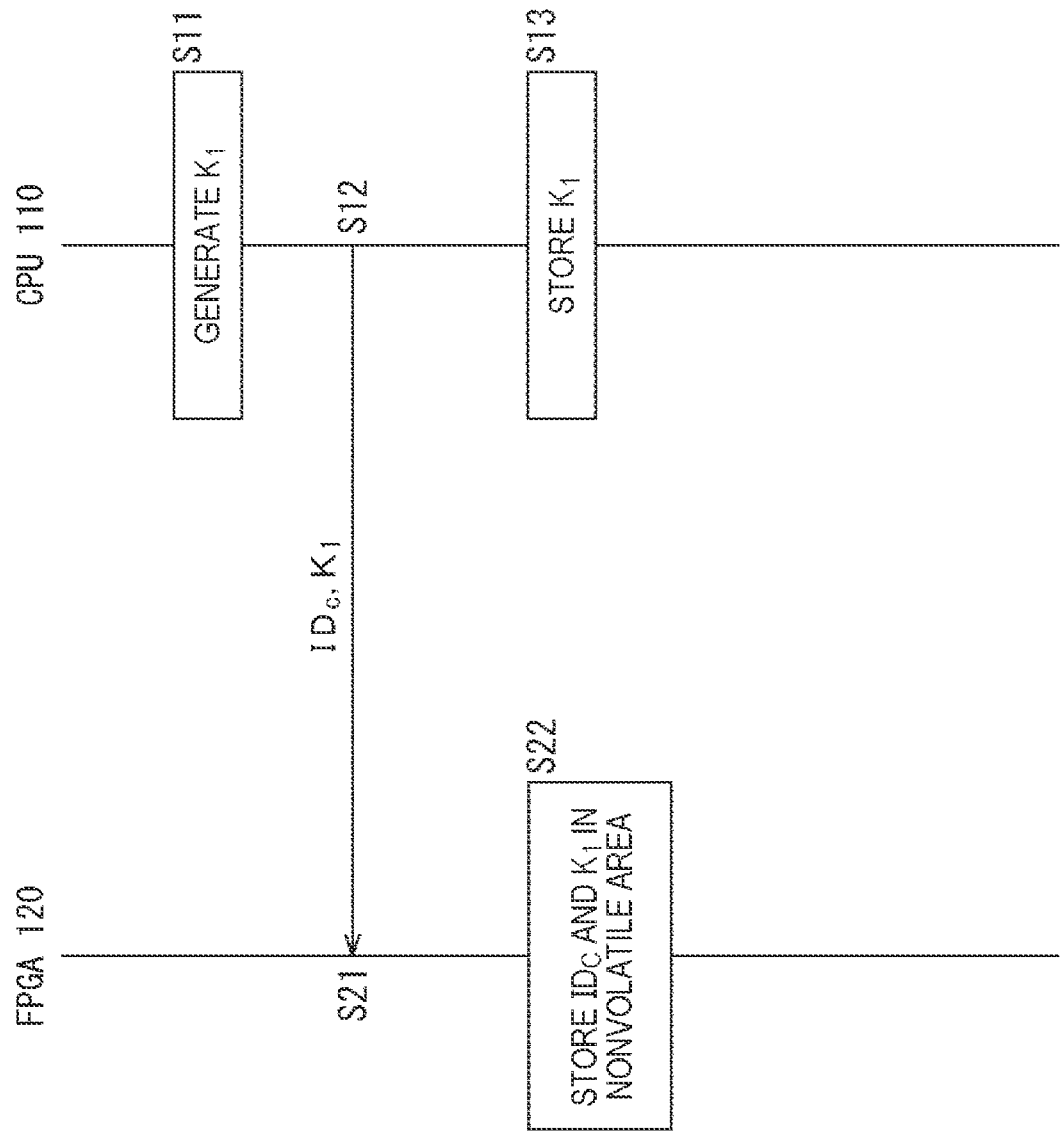
FIG. 4 is a diagram for explaining a flow of key sharing and saving.

Next, referring to FIG. 4, a flow of key sharing and storing in the CPU 110 and the FPGA 120 at the factory is described.

In step S11, the CPU 110 generates a key $K_1$, which is to be the common key, with a pseudorandom number generator (PRNG).

In step S12, the CPU 110 transmits the generated key $K_1$, together with the identification information $ID_C$ held therein, to the FPGA 120.

After that, in step S13, the CPU 110 stores the generated key $K_1$.

Meanwhile, in step S21, the FPGA 120 receives the identification information $ID_C$ and the key $K_1$ transmitted from the CPU 110.

After that, in step S22, the FPGA 120 stores the received identification information $ID_C$ and key $K_1$ into the internal nonvolatile area.

Figure 5:
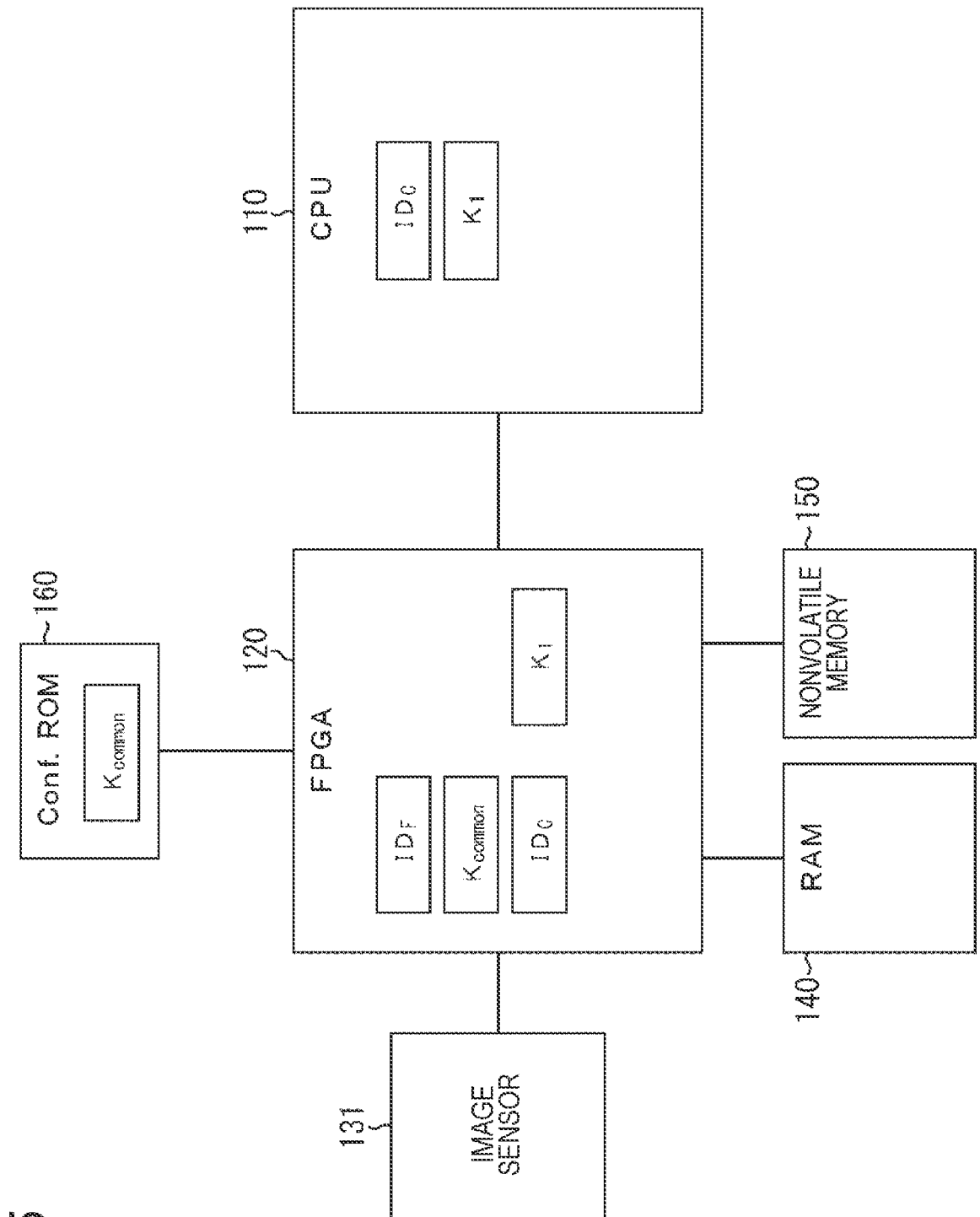
FIG. 5 is a diagram showing a state of the fingerprint authentication device.

FIG. 5 is a diagram showing the state of the fingerprint authentication device 100 after the key $K_1$ is shared and stored.

In the fingerprint authentication device 100 in FIG. 5, the CPU 110 holds the key $K_1$, in addition to the state shown in FIG. 3.

On the other hand, the FPGA 120 holds the identification information $ID_C$ of the CPU 110 and the key $K_1$ in the internal nonvolatile area, in addition to the state shown in FIG. 3. When the power to the fingerprint authentication device 100 is off, the FPGA 120 holds only the identification information $ID_C$ and the key $K_1$.

Note that the key $K_1$ is not necessarily generated by the CPU 110, but may be generated by an external device and be supplied to the CPU 110 and the FPGA 120.

3-3. Key Sharing when the Power is Turned on

Figure 6:
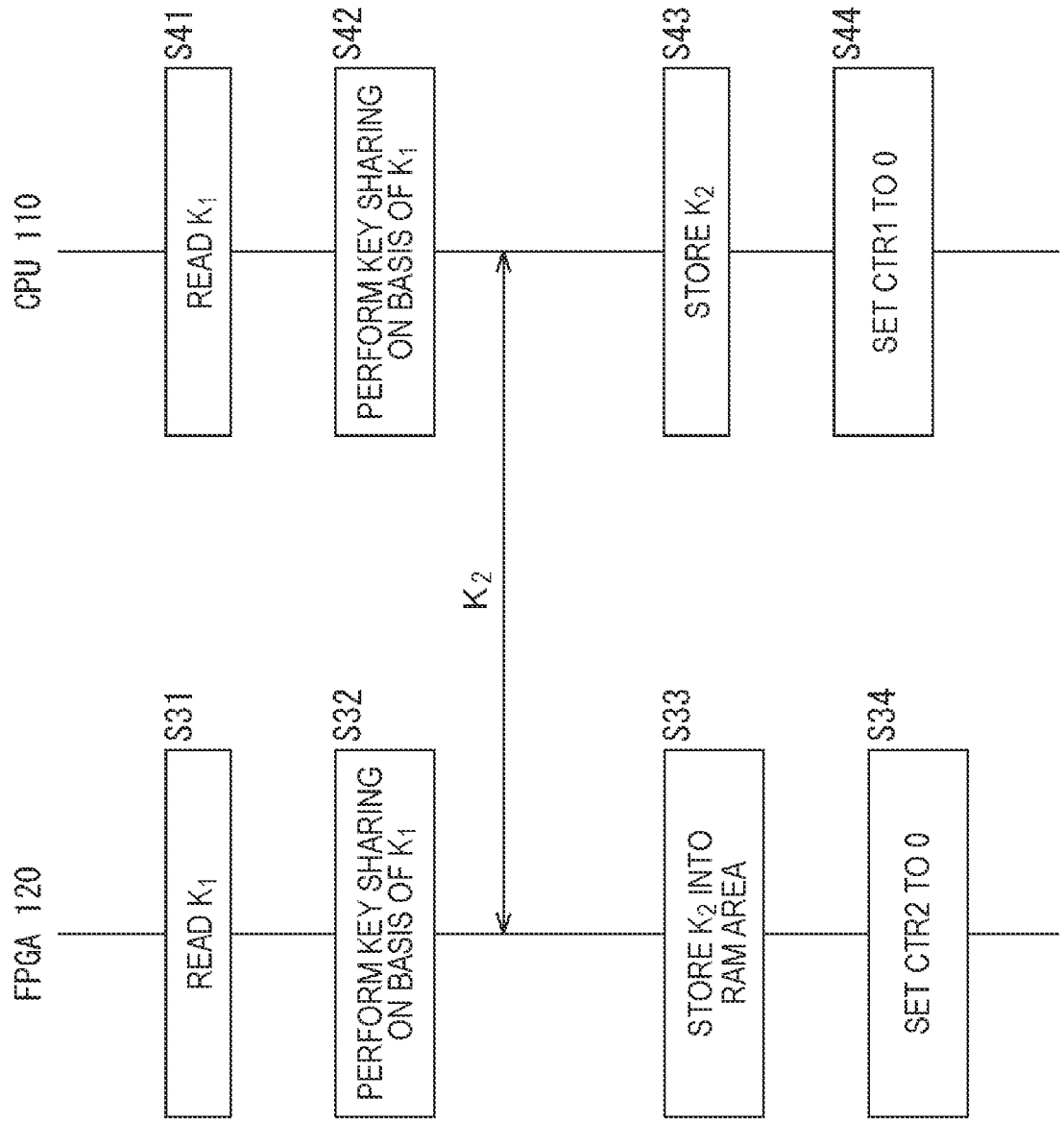

Next, referring to FIG. 6, a flow of key sharing in the CPU 110 and the FPGA 120 when the power is turned on is described.

In step S31, the FPGA 120 reads the key $K_1$ from the internal nonvolatile area.

Meanwhile, the CPU 110 also reads the key $K_1$ in step S41.

The FPGA 120 and the CPU 110 perform key sharing on the basis of the key $K_1$ in steps S32 and S42, respectively. For example, key sharing is performed using a key sharing protocol (ISO/IEC 11770-2) with the key $K_1$ as the common key. At this point of time, mutual authentication based on ISO/IEC 9798-2 is also conducted between the FPGA 120 and the CPU 110. Note that the key sharing protocol is not limited to the one described above.

As a result of steps S32 and S42, a key $K_2$ is shared between the FPGA 120 and the CPU 110.

In step S33, the FPGA 120 stores the shared key $K_2$ in the internal RAM area.

After that, in step S34, the FPGA 120 sets (resets) the internally held counter value CTR2 to 0.

Meanwhile, in step S43, the CPU 110 stores the shared key $K_2$.

After that, in step S44, the CPU 110 sets (resets) the internally held counter value CTR1 to 0.

Figure 7:
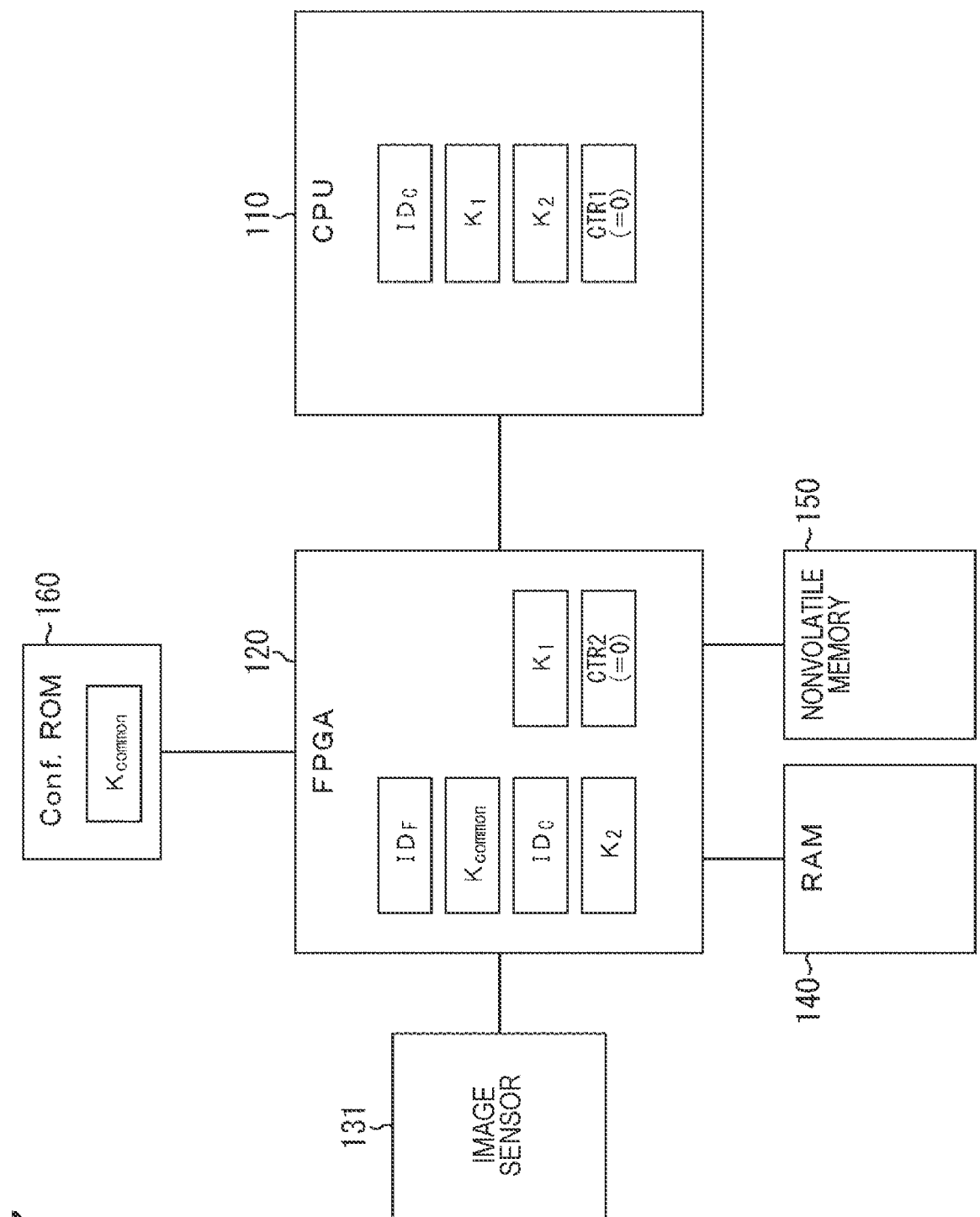
FIG. 7 is a diagram showing a state of the fingerprint authentication device.

FIG. 7 is a diagram showing the state of the fingerprint authentication device 100 after the key sharing at the time of power activation.

In the fingerprint authentication device 100 in FIG. 7, the CPU 110 holds the key $K_2$ and the counter value CTR1 set to 0, in addition to the state shown in FIG. 5.

Meanwhile, the FPGA 120 holds the key $K_2$ and the counter value CTR2 set to 0 in the internal RAM area, in addition to the state shown in FIG. 5.

As described above, in the fingerprint authentication device 100, the key $K_2$ is newly generated each time the power is turned on.

3-4. Generation and Encryption of an Authentication Template

Figure 8:
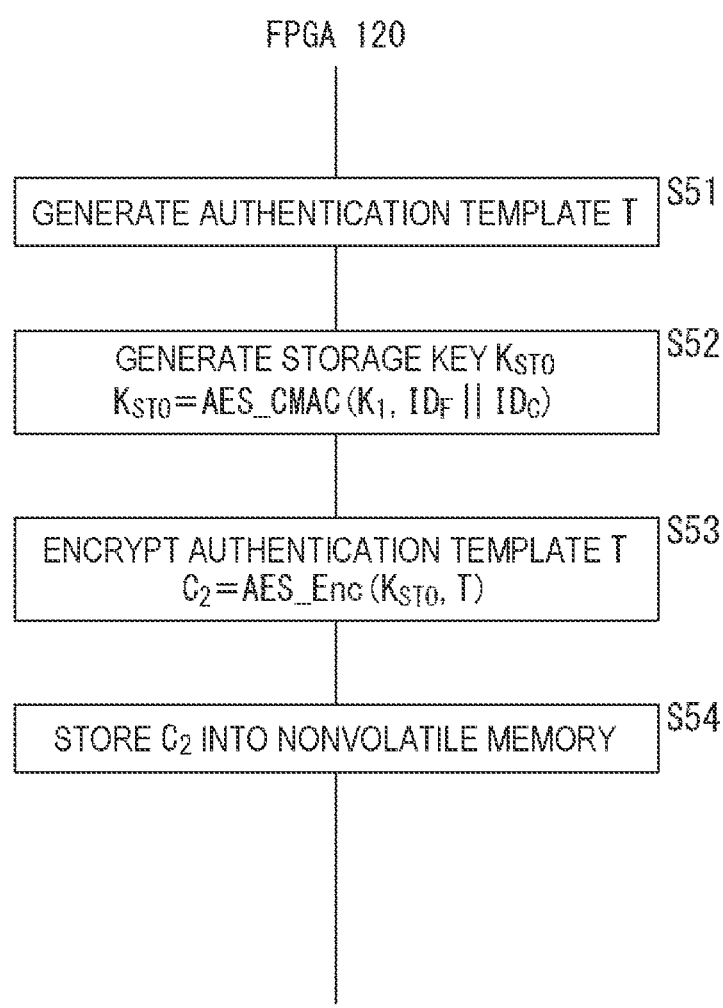
FIG. 8 is a diagram for explaining a flow of generation and encryption of an authentication template.

Next, referring to FIG. 8, a flow of authentication template generation and encryption to be performed in the FPGA 120 when the power is turned on is described. The process shown in FIG. 8 is started when video data obtained as a result of imaging of the fingerprint of the user's finger by the image sensor 131 is supplied to the FPGA 120.

In step S51, the FPGA 120 generates an authentication template T by extracting the feature amount data of the fingerprint of the finger from the video data supplied from the image sensor 131, on the basis of a predetermined algorithm.

In step S52, the FPGA 120 generates a storage key $K_{STO}$=AES_CMAC ($K_1$, $ID_F \| ID_C$), on the basis of the Advanced Encryption Standard (AES)—Cipher-Based Message Authentication Code (CMAC) algorithm. In the generation of the storage key $K_{STO}$, the key $K_1$, and the data $ID_F \| ID_C$ obtained by joining the identification information $ID_F$ of the FPGA 120 and the identification information $ID_C$ of the CPU 110 are used. Note that, here, other than AES, a common key block encryption scheme such as Data Encryption Standard (DES), Triple DES, Fast Data Encipherment Algorithm (FEAL), or International Data Encryption Algorithm (IDEA) may be used. Further, other than CMAC, a MAC algorithm such as Cipher Block Chaining MAC (CBC-MAC) or Hash-based MAC (HMAC) may be used.

In step S53, the FPGA 120 encrypts the authentication template T, using the storage key $K_{STO}$.

In step S54, the FPGA 120 then stores the encrypted authentication template $C_2$=AES_Enc ($K_{STO}$, T) into the nonvolatile memory 150.

Figure 9:
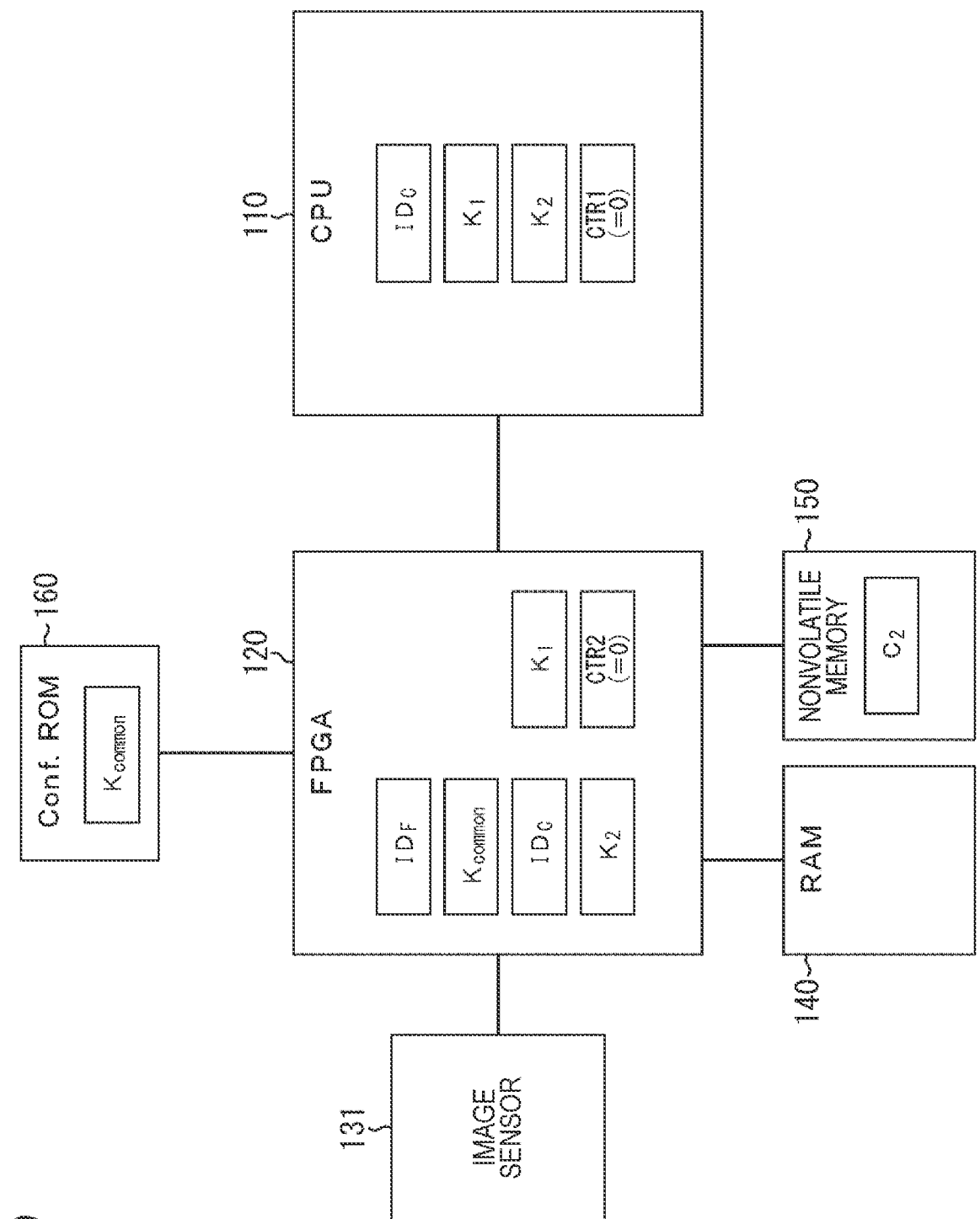
FIG. 9 is a diagram showing a state of the fingerprint authentication device.

FIG. 9 is a diagram showing the state of the fingerprint authentication device 100 after the generation and encryption of the authentication template.

In the fingerprint authentication device 100 in FIG. 9, the encrypted authentication template $C_2$ is stored in the nonvolatile memory 150.

3-5. Encryption and Transmission of an Authentication Result

Figure 10:
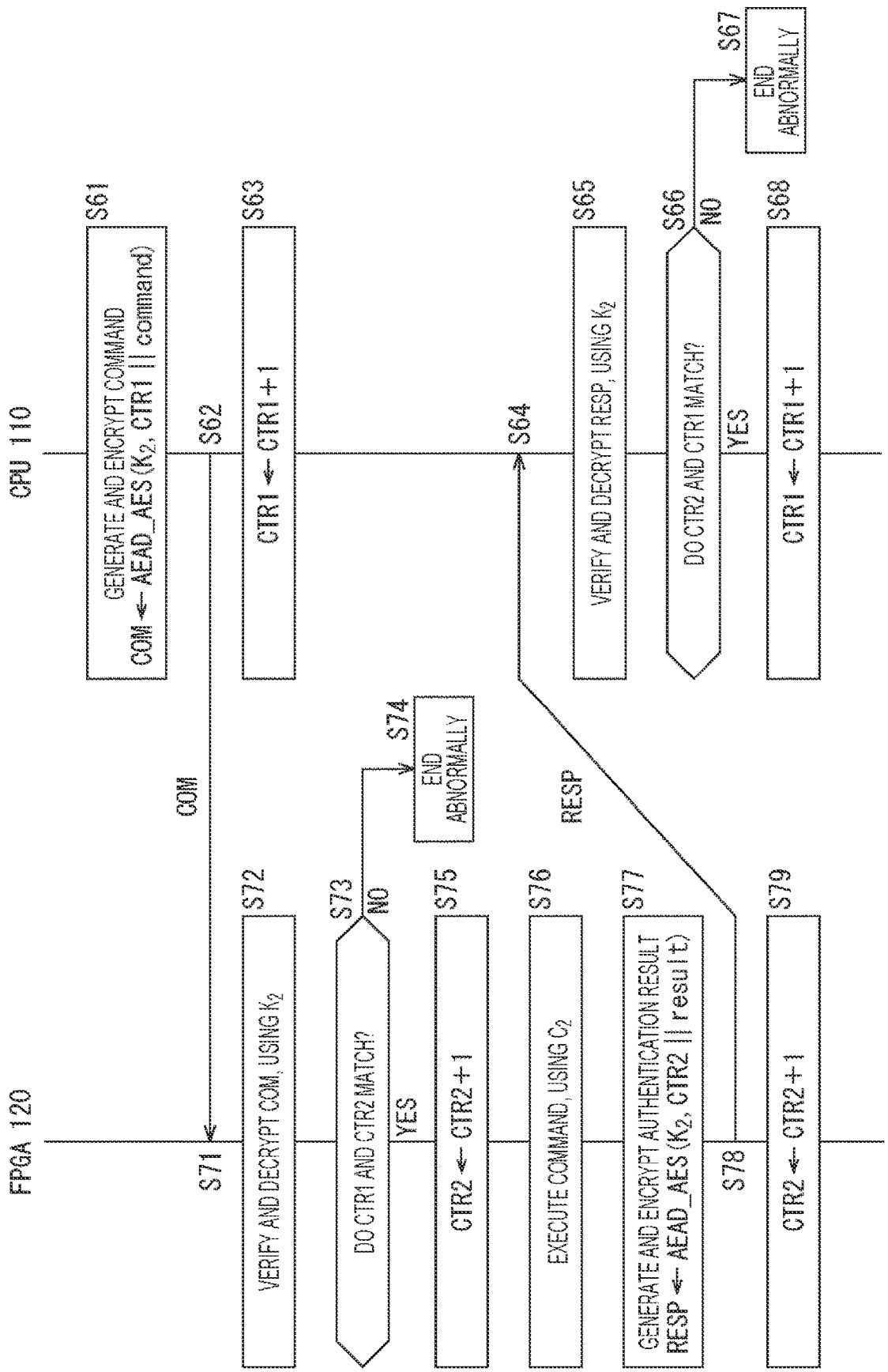
FIG. 10 is a diagram for explaining a flow of encryption and transmission of an authentication result.

Next, referring to FIG. 10, a flow of encryption and transmission of an authentication result in the CPU 110 and the FPGA 120 is described. The process shown in FIG. 10 is started, when the user puts on the fingerprint authentication device 100 designed as a wristwatch-type wearable terminal, and the user's finger being held over the sensor module 130 is detected, for example.

In step S61, the CPU 110 generates a command for causing the FPGA 120 to conduct biometric authentication (fingerprint authentication), and encrypts the command by an authenticated encryption scheme that is Authenticated Encryption with Associated Data (AEAD) using the key $K_2$ as the common key, and AES. At this point of time, the counter value CTR1 is also encrypted, together with the command.

In step S62, the CPU 110 transmits encrypted data COM formed with the encrypted command and counter value CTR1, to the FPGA 120.

After that, in step S63, the CPU 110 increments the counter value CTR1 by 1.

On the other hand, the FPGA 120 receives the encrypted data COM from the CPU 110 in step S71, and verifies (verifies whether there is falsification) and decrypts the encrypted data COM, using the key $K_2$, which is the common key, in step S72.

In step S73, the FPGA 120 determines whether or not the decrypted counter value CTR1 matches the counter value CTR2 held therein.

If it is determined that the counter value CTR1 and the counter value CTR2 do not match, the process moves on to step S74, and then ends abnormally.

If it is determined that the counter value CTR1 and the counter value CTR2 match, on the other hand, the process moves on to step S75, and the FPGA 120 increments the counter value CTR2 by 1.

After that, in step S76, the FPGA 120 executes the decrypted command using the authentication template $C_2$ stored in the nonvolatile memory 150, to conduct fingerprint authentication of the authentication target finger. Specifically, the FPGA 120 conducts fingerprint authentication of the authentication target finger, on the basis of the video data acquired by the image sensor 131 and the authentication template $C_2$.

In step S77, regardless of success or failure of the fingerprint authentication, the FPGA 120 generates an authentication result, and encrypts the authentication result by AEAD using the key $K_2$ as the common key and AES. At this point of time, the incremented counter value CTR2 is also encrypted, together with the authentication result.

In step S78, the FPGA 120 transmits encrypted data RESP formed with the encrypted authentication result and counter value CTR2, to the CPU 110.

After that, in step S79, the FPGA 120 increments the counter value CTR2 by 1.

On the other hand, the CPU 110 receives the encrypted data RESP from the FPGA 120 in step S64, and verifies and decrypts the encrypted data RESP, using the key $K_2$ as the common key, in step S65.

In step S66, the CPU 110 determines whether or not the decrypted counter value CTR2 matches the counter value CTR1 held therein.

If it is determined that the counter value CTR2 and the counter value CTR1 do not match, the process moves on to step S67, and then ends abnormally.

If it is determined that the counter value CTR2 and the counter value CTR1 match, on the other hand, the process moves on to step S68, and the CPU 110 increments the counter value CTR1 by 1.

The result of the fingerprint authentication is supplied to the SE 170, and is used in payment processing by NFC via the RF communication unit 180, for example.

By the above process, when the result of the fingerprint authentication in the FPGA 120 is transmitted to the CPU 110 in the fingerprint authentication device 100, encryption and decryption is performed by an authenticated encryption scheme, and the counter values are synchronized. As a result, falsification of data can be prevented, and resistance against replay attacks can be enhanced. That is, the result of the fingerprint authentication can be transmitted safely between the chips. At this stage, only the fingerprint authentication result is transmitted at high speed and with a small communication amount, while safety is maintained.

4. Modifications

The following is a description of modifications of the embodiment described above.

4-1. First Modification

Figure 11:
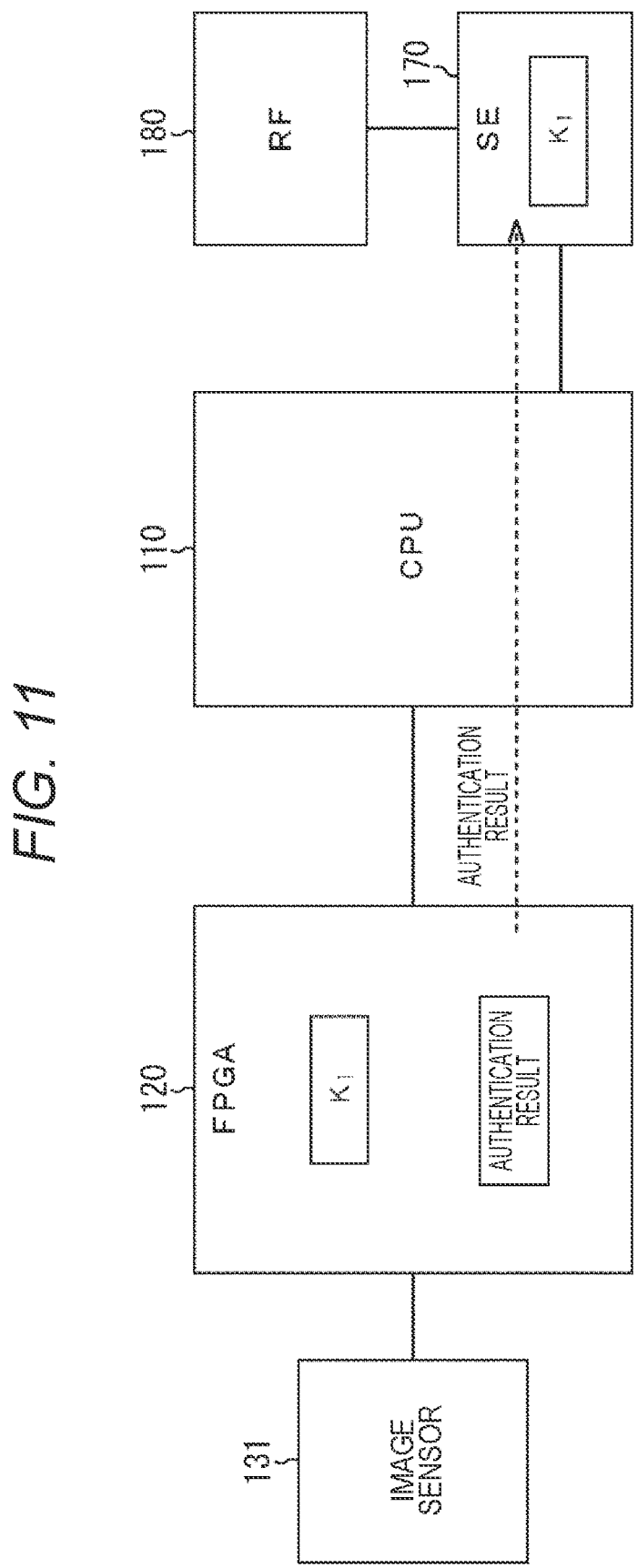
FIG. 11 is a diagram for explaining a modification.

FIG. 11 shows an example configuration of the fingerprint authentication device 100 in which only the SE 170 is informed of the result of the fingerprint authentication.

In the configuration shown in FIG. 11, the CPU 110 does not need to be informed of the authentication result. Accordingly, the authentication result is transmitted from the FPGA 120 directly to the SE 170, with the CPU 110 serving as a simple communication path.

In this case, the key $K_1$ is shared between the SE 170 and the FPGA 120 in a manner similar to that in the process shown in FIG. 4. After that, processes similar to the processes shown in FIGS. 6, 8, and 10 are performed between the SE 170 and the FPGA 120.

With such a configuration, payment processing by NFC via the RF communication unit 180 is performed through fewer procedures, for example.

4-2. Second Modification

Figure 12:
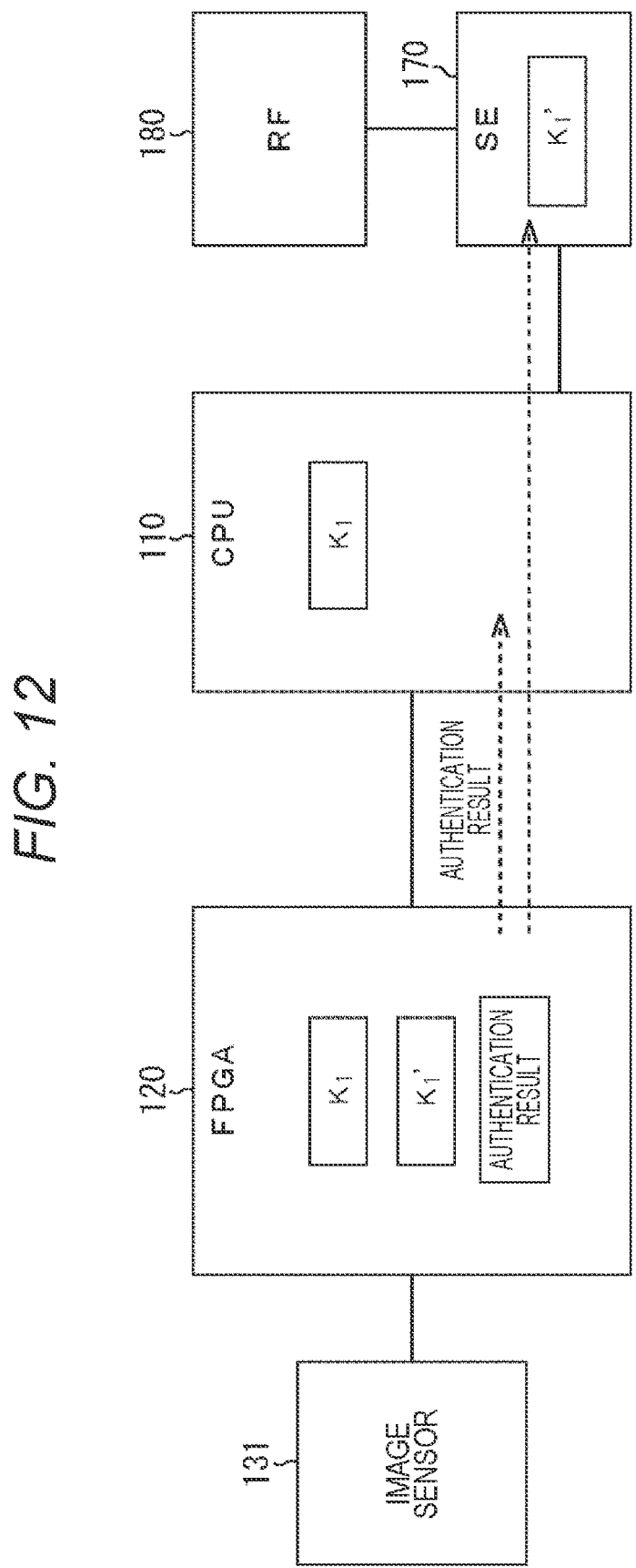
FIG. 12 is a diagram for explaining a modification.

FIG. 12 shows an example configuration of the fingerprint authentication device 100 in which both the CPU 110 and the SE 170 are notified of the result of the fingerprint authentication.

In the configuration shown in FIG. 12, the authentication result is transmitted from the FPGA 120 to both the CPU 110 and the SE 170.

In this case, the key $K_1$ is shared between the CPU 110 and the FPGA 120, according to the process shown in FIG. 4. After that, the processes shown in FIGS. 6, 8, and 10 are performed between the CPU 110 and the FPGA 120.

Further, in a manner similar to that in the process shown in FIG. 4, a key $K_1'$ different from the key $K_1$ is shared between the SE 170 and the FPGA 120. After that, processes similar to the processes shown in FIGS. 6, 8, and 10 are performed between the SE 170 and the FPGA 120.

With such a configuration, the result of the fingerprint authentication can be transmitted safely to both the CPU 110 and the SE 170.

4-3. Third Modification

Figure 13:
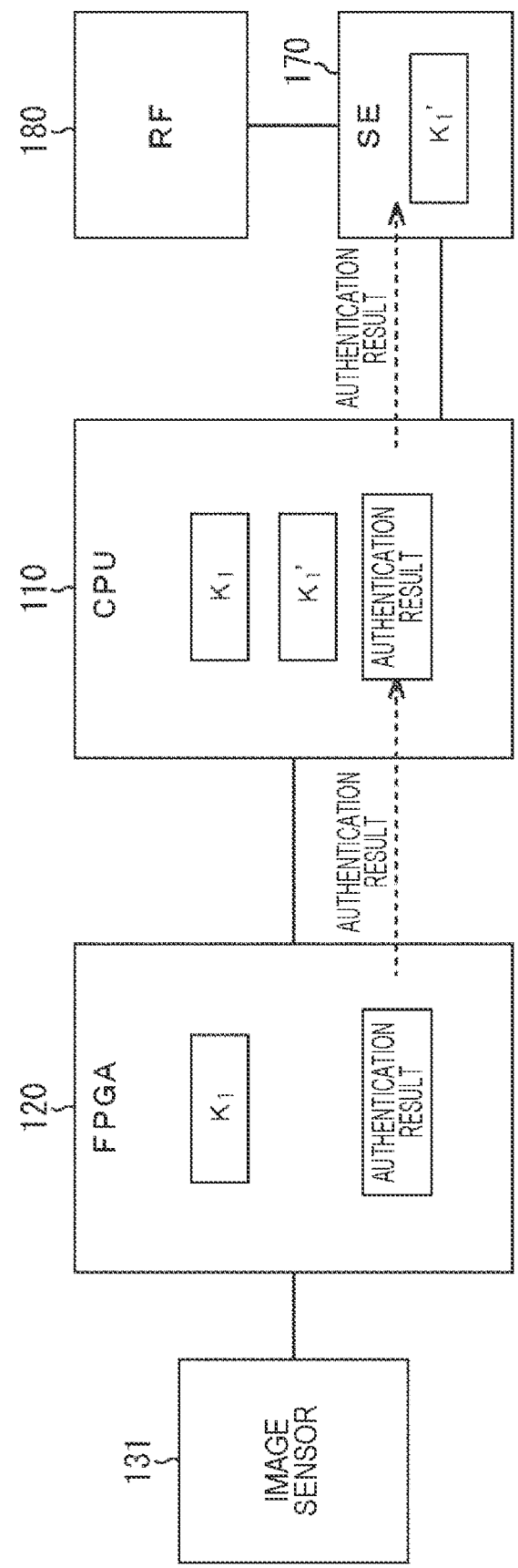
FIG. 13 is a diagram for explaining a modification.

FIG. 13 shows another example configuration of the fingerprint authentication device 100 in which both the CPU 110 and the SE 170 are notified of the result of the fingerprint authentication.

In the configuration shown in FIG. 13, the authentication result is transmitted from the FPGA 120 to the CPU 110. After that, the authentication result decrypted by the CPU 110 is transmitted from the CPU 110 to the SE 170.

In this case, the key $K_1$ is shared between the CPU 110 and the FPGA 120, according to the process shown in FIG. 4. After that, the processes shown in FIGS. 6, 8, and 10 are performed between the CPU 110 and the FPGA 120.

Further, in a manner similar to that in the process shown in FIG. 4, a key $K_1'$ different from the key $K_1$ is shared between the SE 170 and the CPU 110. After that, processes similar to the processes shown in FIGS. 6, 8, and 10 are performed between the SE 170 and the CPU 110.

With such a configuration, the result of the fingerprint authentication can also be transmitted safely to both the CPU 110 and the SE 170.

4-4. Fourth Modification

In the above description, configurations designed on the assumption that the user is authenticated when putting on a wearable terminal have been explained, for example.

Figure 14:
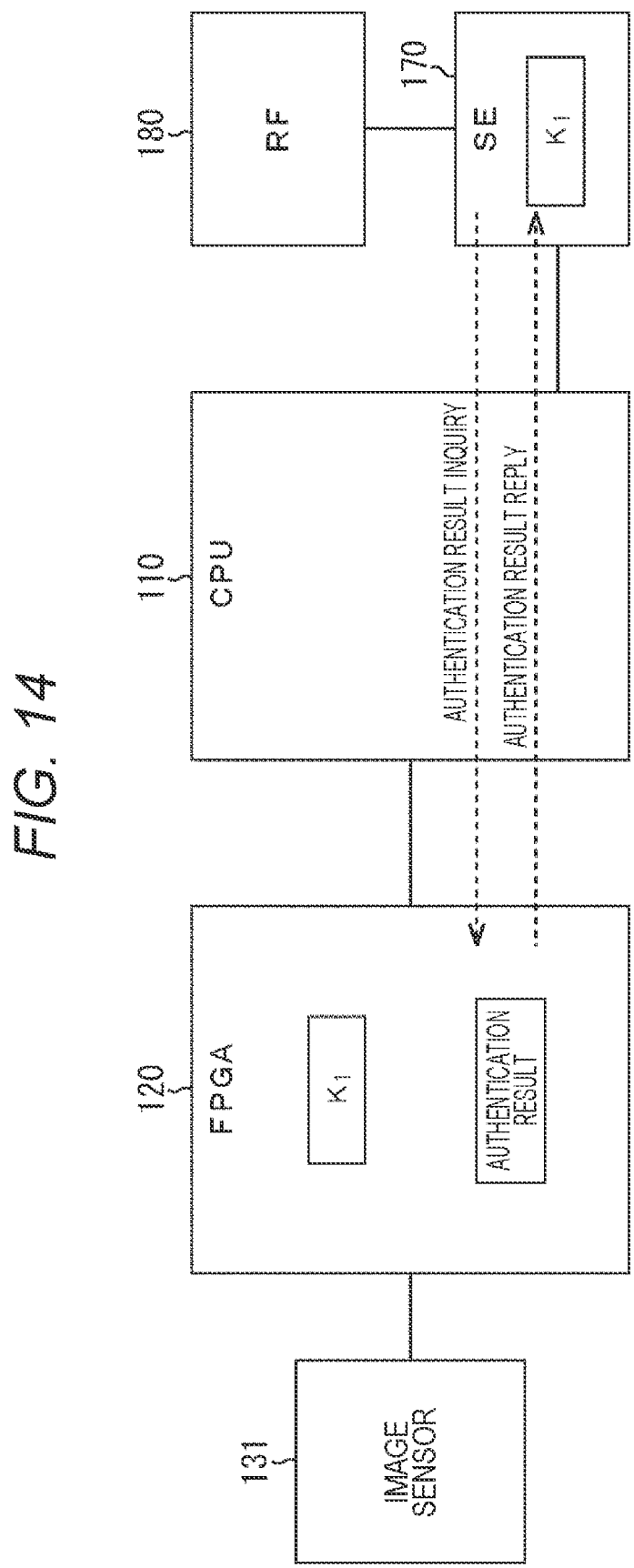
FIG. 14 is a diagram for explaining a modification.

However, as shown in FIG. 14, when an authentication result is required in the SE 170, the SE 170 may inquire of the FPGA 120 about an authentication result, and the FPGA 120 may send the authentication result held therein as a reply to the SE 170, for example.

This configuration can be applied in a case where authentication of the user is performed by causing the user to touch a POS terminal with a wearable terminal once at the time of payment, and again if the payment amount is higher than a certain amount, for example. With such a configuration, safety of authentication can be further enhanced.

4-5. Fifth Modification

In the above description, configurations for performing encryption and decryption with minimum security guaranteed in the same device have been explained. However, the technology according to the present disclosure can also be applied to a configuration for performing encryption and decryption not in the same device but via a network.

FIG. 15 shows an example configuration of a system in which the technology according to the present disclosure is applied to a server and a device that are connected via a network.

In the system shown in FIG. 15, a server 210, and a device 220 including the CPU 110, the FPGA 120, and the image sensor 131 are connected via a network NW.

In the configuration in FIG. 15, an authentication result is transmitted from the device 220 to the server 210. The server 210 performs processing using the authentication result supplied from the device 220.

In this case, the server 210 and the device 220 (the FPGA 120) share the key $K_1$ in a manner similar to that in the process shown FIG. 4. After that, processes similar to the processes shown in FIGS. 6, 8, and 10 are performed between the server 210 and the device 220.

4-6. Sixth Modification

The technology according to the present disclosure is not limited to a configuration in which authentication is conducted only once, such as fingerprint authentication, for example, but can also be applied to a configuration in which authentication is continuously conducted a plurality of times, such as gait authentication, for example. Specifically, in the FPGA 120, authentication is conducted on the basis of sensor data obtained from an acceleration sensor once in several seconds, and authentication results are transmitted to the CPU 110.

FIG. 16 is a diagram for explaining a flow of encryption and transmission of authentication results in a configuration in which authentication is continuously conducted a plurality of times.

Note that, prior to steps S81 and S91 in FIG. 16, processes similar to the processes in steps S71 to S75 and S61 to S63 in FIG. 10 are performed. Also, the processes in steps S81 to 384 and 391 to S95 in FIG. 16 are similar to the processes in steps 376 to S79 and S64 to S68 in FIG. 10.

In the process shown in FIG. 16, in step 385, the FPGA 120 determines whether or not an authentication result has been transmitted a required number of times. Until an authentication result has been transmitted the required number of times, the FPGA 120 repeats steps S81 to S84, and the CPU 110 repeats steps 391 to 395.

That is, the FPGA 120 conducts biometric authentication a plurality of times, on the basis of a decrypted command. The FPGA 120 then encrypts a result of the biometric authentication each time, and transmits a result to the CPU 110 a plurality of times.

At this stage, the FPGA 120 may transmit an authentication result to the CPU 110 the number of times of transmission specified in the command from the CPU 110, or may continue to transmit an authentication result to the CPU 110 until receiving a transmission end command from the CPU 110. Alternatively, the FPGA 120 may stop the transmission of an authentication result by transmitting a transmission end message to the CPU 110.

By the processes described above, it is possible to prevent falsification of data, and enhance resistance against replay attacks even in a device that conducts gait authentication. Thus, results of gait authentication can be transmitted safely between chips.

The series of processes described above can be performed by hardware, and can also be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions, having various kinds of programs installed therein, for example.

In a computer including the fingerprint authentication device 100 described above, the CPU 110 and the FPGA 120 load and execute a program stored in a storage unit (not illustrated) or the nonvolatile memory 150, to perform the series of processes described above.

The program to be executed by the computer (the CPU 110 and the FPGA 120) may be recorded on a removable medium or the like as a package medium to be provided, for example. Alternatively, the program can be provided via a wired or wireless transmission medium, such as a local area network, the Internet, or digital satellite broadcasting.

In the computer, the program can be installed into the storage unit or the nonvolatile memory 150 when the removable medium is mounted on the drive. Also, the program can be installed into the storage unit or the nonvolatile memory 150 via a wired or wireless transmission medium. Alternatively, the program can be installed beforehand into the configuration ROM 160.

Note that the program to be executed by the computer may be a program for performing processes in chronological order in accordance with the sequence described in this specification, or may be a program for performing processes in parallel or performing a process when necessary, such as when there is a call.

Note that, in this specification, steps describing a program recorded on a recording medium include processes to be performed in parallel or independently of one another if not necessarily in chronological order, as well as processes to be performed in chronological order in accordance with the sequence described herein.

Embodiments of the technology according to the present disclosure are not limited to the embodiment described above, and various changes can be made to it without departing from the scope of the technology according to the present disclosure.

Furthermore, the advantageous effects described in this specification are merely examples, and the advantageous effects of the technology are not limited to them and may include other effects.

Further, the technology according to the present disclosure can also be embodied in the configurations described below.

(1)

A data processing device including:

a first chip that performs encryption and decryption using a first common key, and holds a first counter value; and a second chip that performs encryption and decryption using the first common key, and holds a second counter value, in which the first chip encrypts a command and the first counter value, and transmits the command and the first counter value to the second chip, the second chip encrypts an execution result of the command decrypted and the second counter value, and transmits the execution result and the second counter value to the first chip, and the first chip and the second chip synchronize the first counter value and the second counter value, each time transmitting or receiving data to or from each other.

(2)

The data processing device according to (1), in which each of the first chip and the second chip performs matching determination on the first counter value and the second counter value that have been decrypted, after receiving the data from the other, and after the matching determination and after transmission of the data to the other, updates the first counter value or the second counter value held by the respective chips.

(3)

The data processing device according to (2), in which the first chip and the second chip continue to perform processing when the first counter value and the second counter value match as a result of the matching determination, and end the processing when the first counter value and the second counter value do not match.

(4)

The data processing device according to any one of (1) to (3), in which the second chip
  conducts biometric authentication, on the basis of the decrypted command, and
  encrypts an authentication result of the biometric authentication, and transmits the encrypted authentication result to the first chip.

(5)

The data processing device according to (4), in which the first chip and the second chip perform encryption and decryption by an authenticated encryption scheme.

(6)

The data processing device according to (4), in which, when power to the data processing device is turned on, the first chip and the second chip share the first common key on the basis of a second common key held by each of the chips, and reset the first counter value and the second counter value held by the respective chips.

(7)

The data processing device according to (6), in which the first chip and the second chip share the first common key, using a predetermined key sharing protocol.

(8)

The data processing device according to (6) or (7), in which the second chip conducts the biometric authentication, using an authentication template encrypted on the basis of the second common key.

(9)

The data processing device according to (8), further including a sensor that acquires sensor data including biological information, in which the second chip conducts the biometric authentication on the living subject, on the basis of the sensor data acquired by the sensor and the authentication template.

(10)

The data processing device according to any one of (6) to (9), in which the second common key is generated by the first chip using a pseudorandom number generator, and is transmitted to the second chip, to be held in the first chip and the second chip.

(11)

The data processing device according to any one of (4) to (10), in which the first chip includes a central processing unit (CPU).

(12)

The data processing device according to any one of (4) to (10), in which the first chip includes a secure element (SE).

(13)

The data processing device according to any one of (4) to (10), further including a third chip that performs encryption and decryption using a third common key, in which the first chip encrypts the authentication result that has been decrypted, using the third common key, and transmits the encrypted authentication result to the third chip.

(14)

The data processing device according to (13), in which the first chip includes a central processing unit (CPU), and the third chip includes a secure element (SE).

(15)

The data processing device according to (4), in which the second chip conducts the biometric authentication a plurality of times, on the basis of the decrypted command, and encrypts an authentication result of the biometric authentication each time, and transmits the encrypted authentication result to the first chip a plurality of times.

(16)

The data processing device according to (15), in which the second chip transmits the authentication result to the first chip the number of times of transmission specified in the command.

(17)

The data processing device according to (15), in which the second chip transmits the authentication result to the first chip, until receiving a transmission end command from the first chip.

(18)

The data processing device according to (15), in which the second chip stops transmission of the authentication result by transmitting a transmission end message to the first chip.

(19)

A data processing method implemented by a data processing device, the data processing device including:

a first chip that performs encryption and decryption using a first common key, and holds a first counter value; and a second chip that performs encryption and decryption using the first common key, and holds a second counter value, the data processing method including:
by the first chip, encrypting a command and the first counter value, and transmitting the command and the first counter value to the second chip;
by the second chip, encrypting an execution result of the command decrypted and the second counter value, and transmitting the execution result and the second counter value to the first chip; and
by the first chip and the second chip, synchronizing the first counter value and the second counter value, each time transmitting or receiving data to or from each other.

(20)
A program for causing a computer to function as:
a first chip that performs encryption and decryption using a first common key, and holds a first counter value; and
a second chip that performs encryption and decryption using the first common key, and holds a second counter value,
in which the first chip encrypts a command and the first counter value, and transmits the command and the first counter value to the second chip,
the second chip encrypts an execution result of the command decrypted and the second counter value, and transmits the execution result and the second counter value to the first chip, and
the first chip and the second chip synchronize the first counter value and the second counter value, each time transmitting or receiving data to or from each other.

REFERENCE SIGNS LIST

10 Data processing device
11 First chip
12 Server
13 Sensor
100 Fingerprint authentication device
110 CPU
120 FPGA
131 Image sensor
140 RAM
150 Nonvolatile memory
170 SE
180 RF communication unit

The invention claimed is:
1. A data processing device comprising:
a first chip configured to
  perform encryption and decryption using a first common key, and hold a first counter value; and
a second chip configured to
  perform encryption and decryption using the first common key, and hold a second counter value,
wherein the first chip encrypts a command and the first counter value, and transmits the command and the first counter value to the second chip,
wherein the second chip encrypts an execution result of the command decrypted and the second counter value, and transmits the execution result of the command decrypted and the second counter value to the first chip, and
wherein the first chip and the second chip synchronize the first counter value and the second counter value, each time transmitting or receiving data to or from each other.

2. The data processing device according to claim 1, wherein
each of the first chip and the second chip
  performs matching determination on the first counter value and the second counter value that have been decrypted, after receiving the data from the other, and
  after the matching determination, and after transmission of the data to the other, updates the first counter value or the second counter value held by the respective chips.

3. The data processing device according to claim 2, wherein
the first chip and the second chip continue to perform processing when the first counter value and the second counter value match as a result of the matching determination, and end the processing when the first counter value and the second counter value do not match.

4. The data processing device according to claim 1, wherein
the second chip
  conducts biometric authentication, on a basis of the decrypted command, and
  encrypts an authentication result of the biometric authentication, and transmits the encrypted authentication result to the first chip.

5. The data processing device according to claim 4, wherein
the first chip and the second chip perform encryption and decryption by an authenticated encryption scheme.

6. The data processing device according to claim 4, wherein,
when power to the data processing device is turned on, the first chip and the second chip share the first common key on a basis of a second common key held by each of the chips, and reset the first counter value and the second counter value held by the respective chips.

7. The data processing device according to claim 6, wherein
the first chip and the second chip share the first common key, using a predetermined key sharing protocol.

8. The data processing device according to claim 6, wherein
the second chip conducts the biometric authentication, using an authentication template encrypted on a basis of the second common key.

9. The data processing device according to claim 8, further comprising
a sensor that acquires sensor data including biological information,
wherein the second chip conducts the biometric authentication on the living subject, on a basis of the sensor data acquired by the sensor and the authentication template.

10. The data processing device according to claim 6, wherein
the second common key is generated by the first chip using a pseudorandom number generator, and is transmitted to the second chip, to be held in the first chip and the second chip.

11. The data processing device according to claim 4, wherein
the first chip includes a central processing unit (CPU).

12. The data processing device according to claim 4, wherein
the first chip includes a secure element (SE).

13. The data processing device according to claim 4, further comprising
a third chip that performs encryption and decryption using a third common key,
wherein the first chip encrypts the authentication result that has been decrypted, using the third common key, and transmits the encrypted authentication result to the third chip.

14. The data processing device according to claim 13, wherein
the first chip includes a central processing unit (CPU), and
the third chip includes a secure element (SE).

15. The data processing device according to claim 4, wherein
the second chip
conducts the biometric authentication a plurality of times, on a basis of the decrypted command, and
encrypts an authentication result of the biometric authentication each time, and
transmits the encrypted authentication result to the first chip a plurality of times.

16. The data processing device according to claim 15, wherein
the second chip transmits the authentication result to the first chip the number of times of transmission specified in the command.

17. The data processing device according to claim 15, wherein
the second chip transmits the authentication result to the first chip, until receiving a transmission end command from the first chip.

18. The data processing device according to claim 15, wherein
the second chip stops transmission of the authentication result by transmitting a transmission end message to the first chip.

19. A data processing method implemented by a data processing device,
the data processing device including:
a first chip that performs encryption and decryption using a first common key, and holds a first counter value; and
a second chip that performs encryption and decryption using the first common key, and holds a second counter value,
the data processing method comprising:
by the first chip, encrypting a command and the first counter value, and transmitting the command and the first counter value to the second chip;
by the second chip, encrypting an execution result of the command decrypted and the second counter value, and transmitting the execution result of the command decrypted and the second counter value to the first chip; and
by the first chip and the second chip, synchronizing the first counter value and the second counter value, each time transmitting or receiving data to or from each other.

20. A non-transitory computer-readable storage medium having embodied thereon a program, which when executed by a computer causes the computer to execute a method, the method comprising:
performing, by a first chip, encryption and decryption using a first common key;
holding, by the first chip, a first counter value;
performing, by a second chip, encryption and decryption using the first common key; and
holding, by the second chip, a second counter value,
wherein the first chip encrypts a command and the first counter value, and transmits the command and the first counter value to the second chip,
the second chip encrypts an execution result of the command decrypted and the second counter value, and transmits the execution result of the command decrypted and the second counter value to the first chip, and
the first chip and the second chip synchronize the first counter value and the second counter value, each time transmitting or receiving data to or from each other.

* * * * *